United States Patent
Rajadnya et al.

(10) Patent No.: US 10,002,087 B1
(45) Date of Patent: Jun. 19, 2018

(54) COMMUNICATION BETWEEN AN EXTERNAL PROCESSOR AND FPGA CONTROLLER

(71) Applicant: EMC IP Holding Company LLC, Hopkinton, MA (US)

(72) Inventors: Samir Rajadnya, San Jose, CA (US); Karthik Ramachandran, Cupertino, CA (US); Michael Nishimoto, Saratoga, CA (US); Richard H. Van Gaasbeck, Mountain View, CA (US); Bruce Wong, Mountain View, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 100 days.

(21) Appl. No.: 15/087,976

(22) Filed: Mar. 31, 2016

(51) Int. Cl.
*G06F 13/36* (2006.01)
*G06F 11/00* (2006.01)
*G06F 13/16* (2006.01)
*G06F 13/42* (2006.01)

(52) U.S. Cl.
CPC ...... *G06F 13/1694* (2013.01); *G06F 13/1673* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 8,495,252 B2* | 7/2013 | Lais | G06F 13/404 710/1 |
| 2013/0297806 A1* | 11/2013 | Catangiu | G06F 9/505 709/227 |
| 2014/0195711 A1* | 7/2014 | Bhatia | G06F 13/4221 710/313 |
| 2016/0103745 A1* | 4/2016 | Zhou | G06F 11/2094 714/6.3 |

* cited by examiner

*Primary Examiner* — Hyun Nam
(74) *Attorney, Agent, or Firm* — Van Pelt, Yi & James LLP (57) ABSTRACT

A request is received via a message submission queue. The request is sent from a core associated with an external processor coupled by a communication interface. The message submission queue is associated with a memory access engine circuit configured to perform one or more memory access functions. The memory access engine circuit is used to dequeuer a next message from its corresponding message submission queue. The memory access engine circuit is used to perform a message function invoked by the message. The memory access engine circuit is used to receive a result of performing the message function. The memory access engine circuit is used to prepare and send to an external processing core that sent the message a response message determined based at least in part on the result.

19 Claims, 7 Drawing Sheets

FIG. 6

COMMUNICATION BETWEEN AN EXTERNAL PROCESSOR AND FPGA CONTROLLER

BACKGROUND OF THE INVENTION

A high performance memory access device with a plurality of memory modules may require both a high throughput data path and a flexible control path. High throughput data paths may use a gate array device such as an FPGA or ASIC, as logic gates consume silicon real estate but are lower latency. Flexible control paths may use software/firmware with an instruction-based processor which is a higher latency approach. Communication is required to integrate these two technologies.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Communication between an external processor and a gate array controller is disclosed. Throughout this specification, a processor is considered an "external processor" if it is used to perform functions across a plurality of memory devices. Throughout this specification, a gate array device refers without limitation to any collection of logic gates, for example an FPGA or an ASIC. In one embodiment, an FPGA controller is used on a memory module to connect to a set of non-volatile memory devices on the memory module.

Partitioning the data path to an FPGA controller enables high throughput and low latency from the set of non-volatile memory devices. Using one or more external processors to control the data flow enables flexibility and enables dynamic control that can proactively/reactively respond to changes in host and/or environmental conditions. To further improve performance of the system, a "push" data transfer mode may be used, which throughout this specification refers to a system of using PCI writes and DMA writes to affect a read so that the PCI read command is at least partially deprecated: The PCI read command requires round trip latency that reduces overall system performance.

If the communication between FPGA controller and external processor is synchronous, it may cause a 'lock'. Throughout this specification, a lock refers to a synchronous blocking event wherein an external processor and/or FPGA controller must expend time to wait until a function related to the external processor and/or FPGA controller is completed before issuing a second command which does not have any dependency on the first command.

Asynchronous communication between an external processor and one or more FPGA controllers is disclosed. Each FPGA controller may comprise a plurality of memory access engine circuits, which use one or more message submission queues and message completion queues to allow an asynchronous approach to control.

Figure 1:
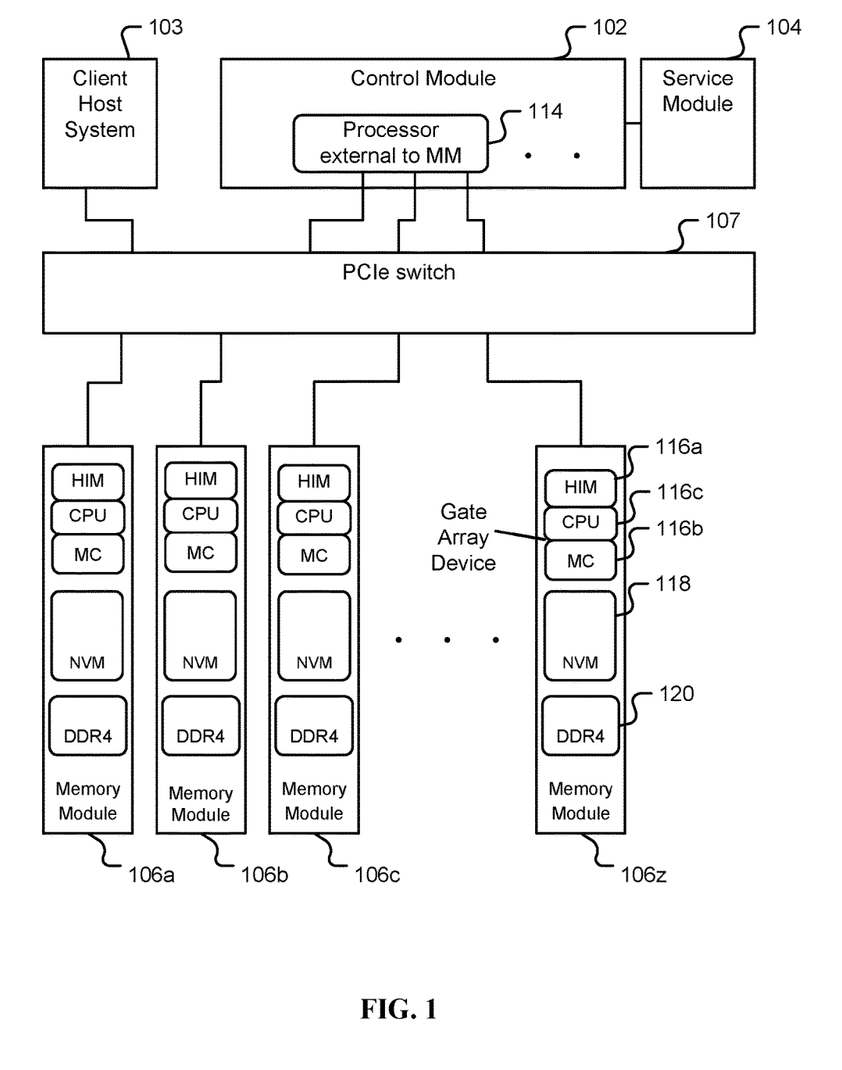
FIG. 1 is a block diagram illustrating an embodiment of a system for a memory access device.

FIG. 1 is a block diagram illustrating an embodiment of a system for a memory access device.

The system comprises a control module (102) coupled to both a host/user/client (103), a service module (104) and a plurality of memory modules (106a)-(106z). One or more client/host systems (103) are coupled to the data storage system using a PCIe switch/fabric (107) which connects the processor (114) with each memory modules as well (106). The PCIe switch incorporates a high throughput bus to couple to the host (103), for example PCIe Gen 3 with between x4 and x96 lanes. Within the control module (102) there are one or more processors (114) that are external to the memory modules (106a)-(106z). An external processor (114) may have one or more processing cores. An external processor (114) may be coupled internally using a lower throughput bus, for example PCIe 2.0 with x1 lane.

The control module (102) is coupled by PCIe to a memory module (106z), which comprises: a gate array device like an FPGA controller which includes gates for an HIM (host interface module) (116a) and an MC (media controller) (116b); one or more in-FPGA processors (116c); a non-volatile memory media (118), and an associated DDR4 buffer/cache (120).

In one embodiment, a non-volatile memory media (118) may include a next generation memory, for example a memory technology that is a transistorless and/or resistive-based memory. This type of technology may use the DDR4 cache (120) to permit efficient write and read accesses for a given cell.

Figure 2A:
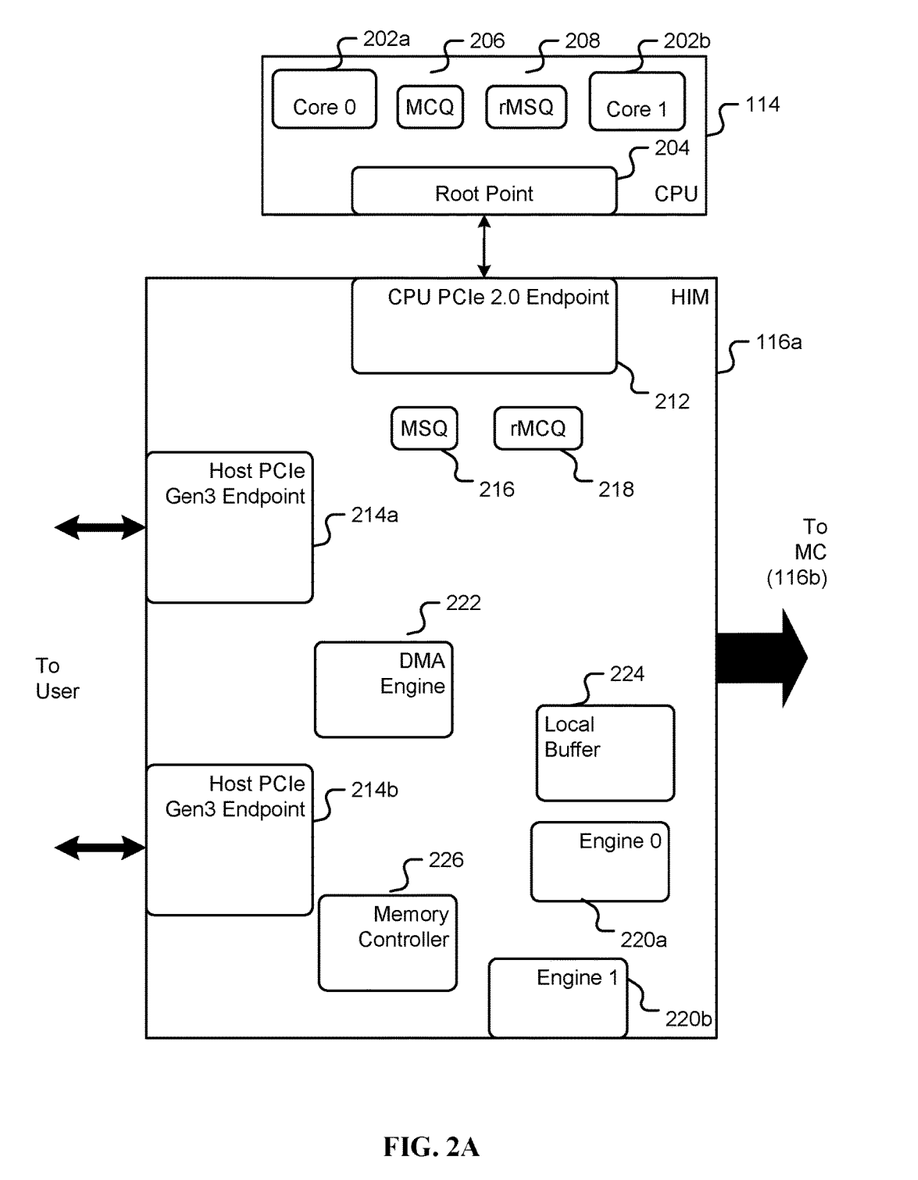
FIG. 2A is a logical block diagram illustrating an embodiment of a system for a host interface module.

FIG. 2A is a logical block diagram illustrating an embodiment of a system for a host interface module. In one embodiment, the system in FIG. 2A is included in (116a) in FIG. 1.

External processor (114) is depicted in more detail, and without limitation is shown with two processing cores (202a), (202b). External processor (114) has a PCIe 2.0 x1 root point (204) and includes one or more logical message completion queues (MCQ) (206) and logical return message submission queues (rMSQ) (208). The host interface module also may have one or more local buffers (224).

HIM (116a) comprises a corresponding PCIe 2.0 x1 endpoint (212), one or more host PCIe Gen3 endpoints (214a) (214b), and a complimentary set of queues including one or more message submission queues (MSQ) (216) and return message completion queues (rMCQ) (218).

In one embodiment, the message queues (206) (208) (216) (218) are implemented as ring buffers to provide natural backflow when full. The MSQ (216) is complimented by MCQ (206) for a complete flow cycle, just as rMSQ (208) is complimented by rMCQ (218) for a complete return flow cycle.

HIM (116a) also comprises one or more queue engines, here shown without limitation to be two named "Engine 0" (220a) and "Engine 1" (220b). HIM (116a) also comprises other gate modules and devices, for example a DMA engine (222), and a media command controller (226). Depending on the architectural requirements of message throughput, more engines like Engine 0 (220a) may be replicated to parallelize the workflow, for example using Engine 1, Engine 2, (not shown) and so forth.

Figure 2B:
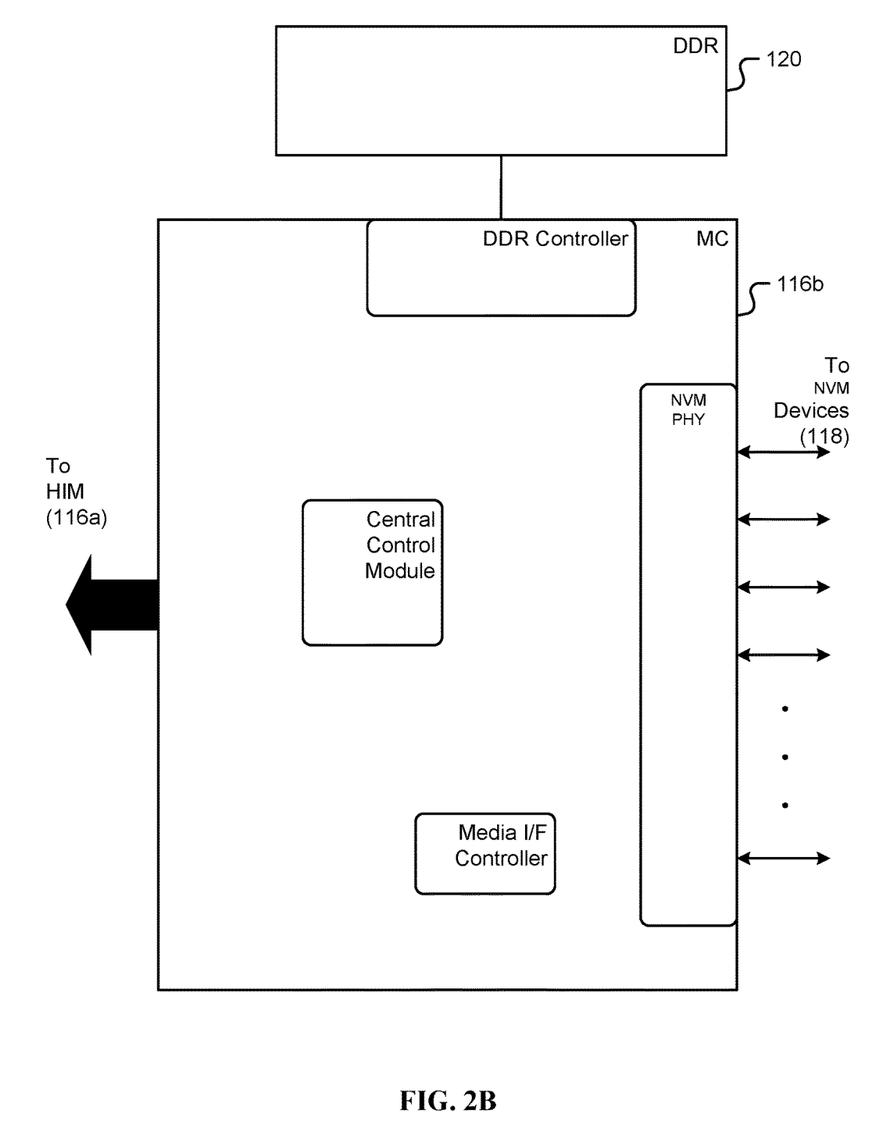
FIG. 2B is a logical block diagram illustrating an embodiment of a system for a media controller.

FIG. 2B is a logical block diagram illustrating an embodiment of a system for a media controller. In one embodiment, the system in FIG. 2B is included in (116b) in FIG. 1.

The DDR DRAM (120) is coupled with a DDR Controller (252); the DDR may be used for example as a cache to permit reading recently written data to the non-volatile devices (118). Other example modules include a PHY (254) for the non-volatile memory (118), a central control module for the MC (256), and a media PHY1 controller (258).

Figure 3:
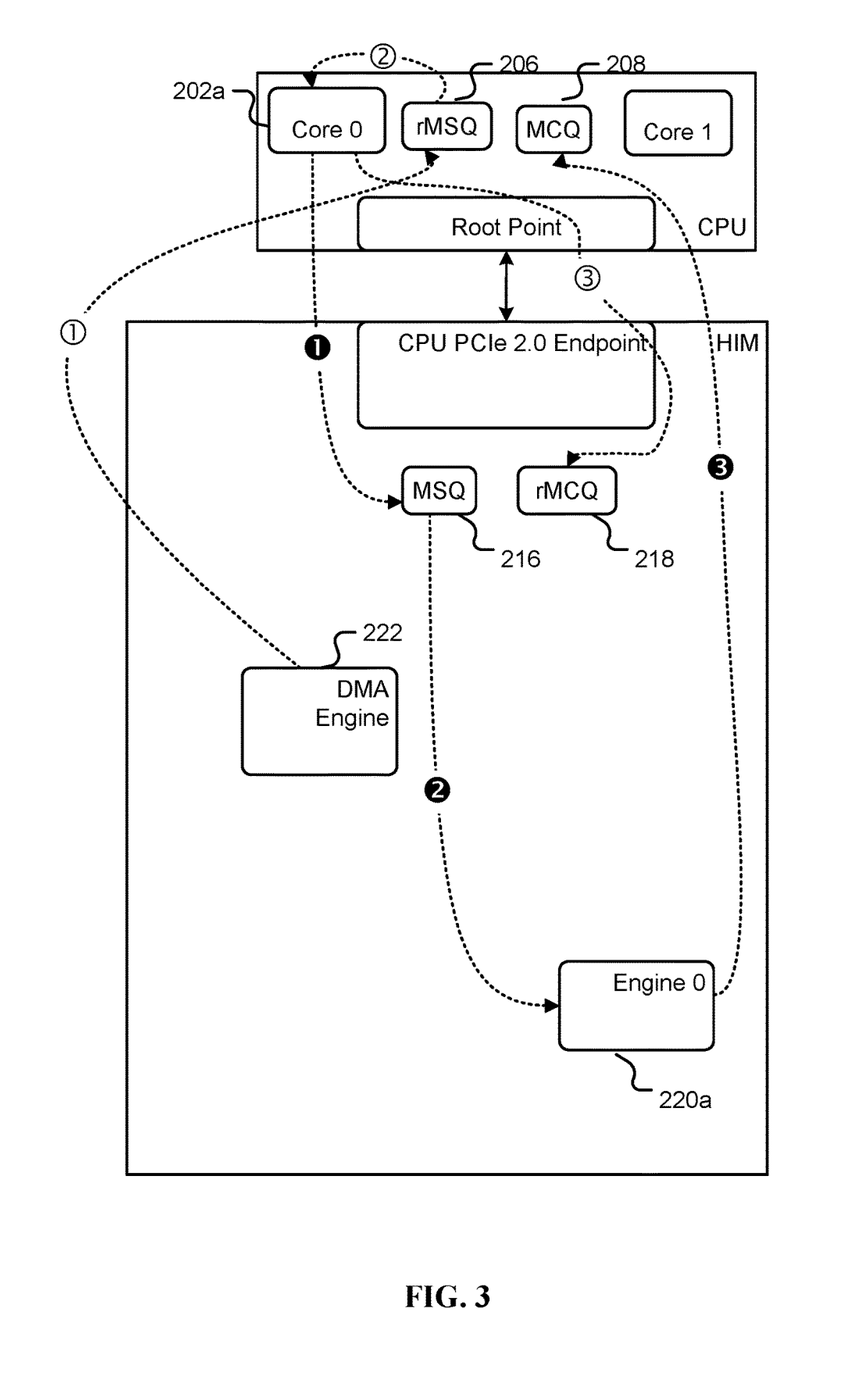
FIG. 3 illustrates an embodiment of a system flow for messages within message queues.

FIG. 3 illustrates an embodiment of a system flow for messages within message queues. A processor to FPGA flow is shown with black circles; an FPGA to processor flow is shown with white circles.

In one embodiment a message comprises:
1. An identifier (ID) to identify the workflow cycle; for example when an operation associated with a first message submitted to the MSQ (216) is completed, a corresponding message submitted to the MCQ (206) has the same identifier as the first message;
2. An opcode indicating the asynchronous work item to be performed; and
3. Zero or more parameters for the opcode. In one embodiment, a target engine (for example Engine 0 (220a)) is a parameter. In one embodiment, a priority ranking is a parameter.

An example for the processor to FPGA flow shown in the black circles:
1. Core 0 (202a) enqueues a message X to MSQ (216) for processing by Engine 0 (220a).
2. When the message X is at the front of MSQ (216), wherein "front" may be normalized or otherwise altered by priority ranking, Engine 0 (220a) dequeues the message X from the MSQ (216). Engine 0 (220a) performs the message X function and may receive a result of the message X function. Engine 0 (220a) prepares and sends a response message to the processor's MCQ (206) with the same ID as message X. In one embodiment, a given response message may be sent via the message completion queue in a different order than the message was received in the message submission queue due to the plurality of queues and/or differing priority rankings.

An example for the return FPGA to processor flow shown in the white circles:
1. An FPGA unit, shown here for example to be the DMA Engine (222) enqueues a return message Y to rMSQ (208) for processing by Core 0 (202a).
2. When the message Y is at the front of rMSQ (208), wherein "front" may be normalized or otherwise altered by priority ranking, Core 0 (202a) dequeues the return message Y from the rMSQ (208).
3. Core 0 (202a) performs the return message Y function and may receive a result of the return message Y function. Core 0 (202a) prepares and sends a response return message to the rMCQ (218).

Figure 4:
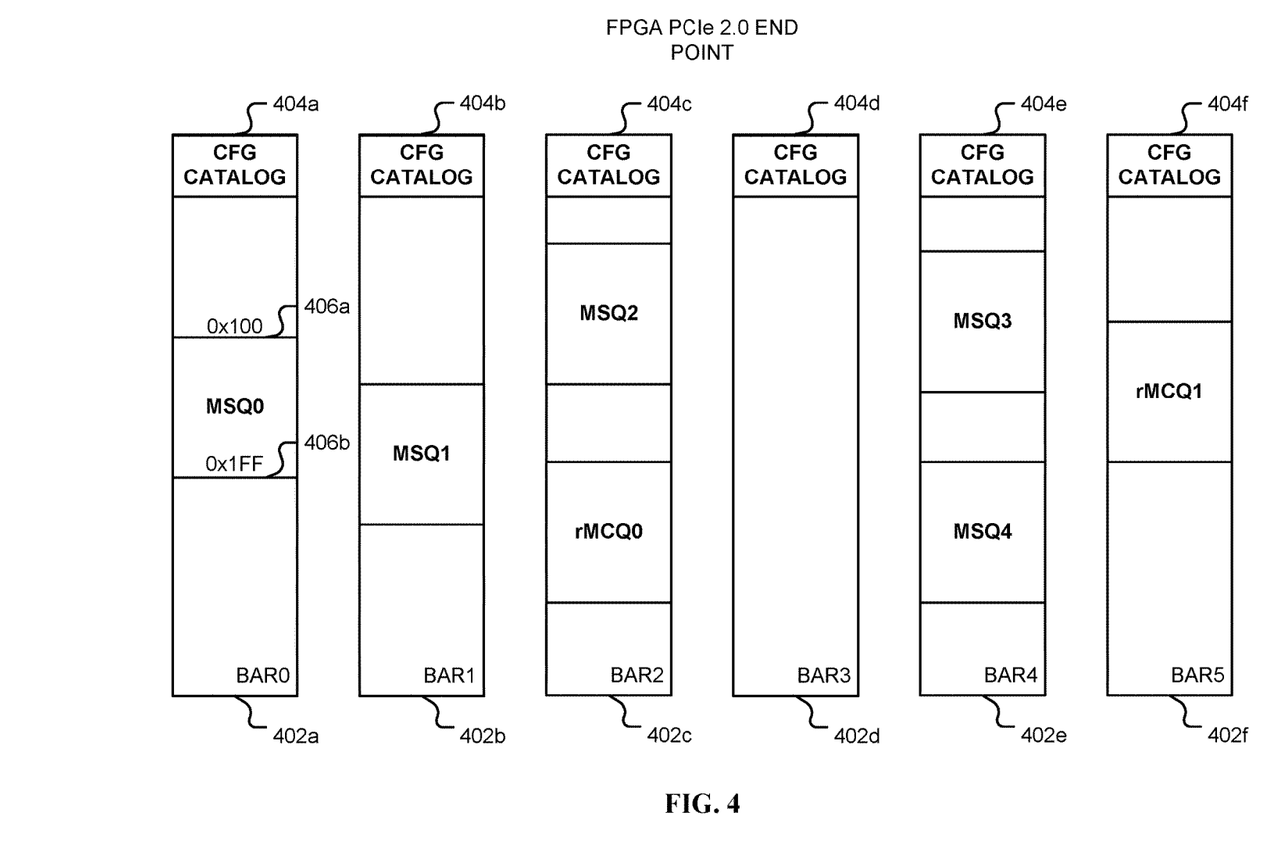
FIG. 4 is a block diagram illustrating an embodiment of a relationship between the PCI base address register space and the message queues.

FIG. 4 is a block diagram illustrating an embodiment of a relationship between the PCI base address register space and the message queues.

In the example in FIG. 4, the BAR space is shown for the FPGA PCIe 2.0 endpoint (212) in FIG. 2. Without limitation, the example shown is for six BARs; BAR0 (402a), BAR1 (402b), BAR2 (402c), BAR3 (402d), BAR4 (402e), and BAR5 (402f).

Each BAR includes a corresponding preset configuration catalog (404a-404f) to indicate the address of one or more message queues within the corresponding BAR. For example in FIG. 4 in BAR0 (402a) the configuration catalog (404a) indicates that ring buffer MSQ0 starts at 0x100 (406a) and ends at 0x1FF (406b). Similarly, BAR1 includes MSQ1; BAR2 includes both MSQ2 and rMCQ0; BAR 3 has no message queues; BAR4 includes MSQ3 and MSQ4, and BAR5 includes rMCQ1.

In one embodiment, three sets of queue including an MSQ, MCQ, rMSQ, and rMCQ fit within six BARs. In one embodiment, the message queues differ by a priority ranking, wherein MSQ0 may be for the highest priority messages, MSQ1 are for the next highest priority messages, and so on.

Figure 5:
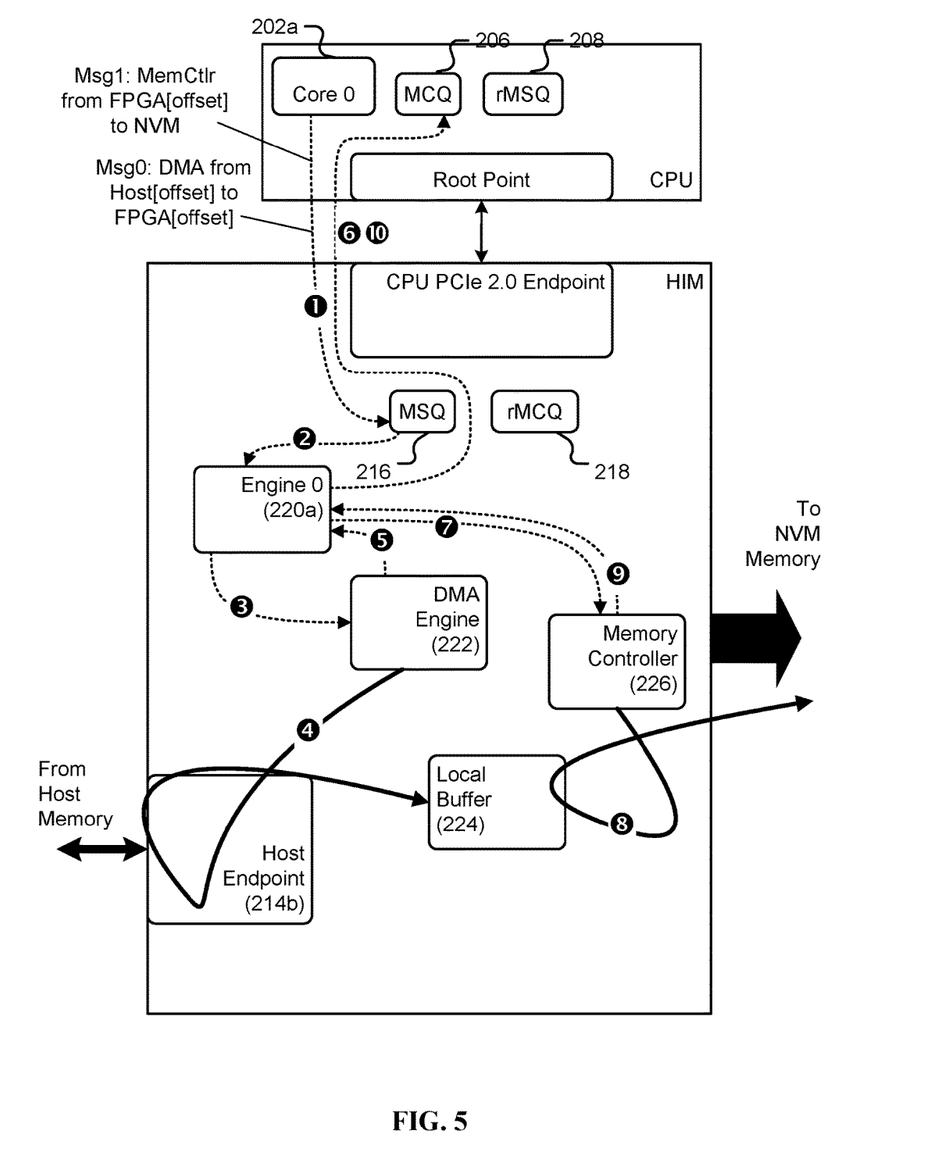
FIG. 5 illustrates an embodiment of a system flow for a typical operation using message queues.

FIG. 5 illustrates an embodiment of a system flow for a typical operation using message queues. The workflow is depicted in order using black circles:
1. Core 0 (202a) enqueues message with ID Msg0 to MSQ (216). Msg0 includes an opcode to perform a host DMA write to an FPGA buffer, with parameters including the offset for the Host address and the offset for an FPGA memory (buffer) address. Core 0 (202a) also enqueues at a later point message with ID Msg1 to MSQ (216). Msg1 includes an opcode to write the FPGA memory to the non-volatile memory, with parameters including the offset for the FPGA memory address and the NVM address.
2. Engine 0 (220a) dequeues Msg0 from MSQ(216) and interprets the message.
3. Engine 0 (220a) performs the message function invoked by Msg0 by configuring DMA Engine (222).

4. DMA Engine (222) is thus configured to impel the host via host endpoint (214*b*) to perform a DMA write to the FPGA buffer (224) at the appropriate offsets.
5. DMA Engine (222) notifies Engine 0 (220*a*) when complete.
6. Engine 0 (220*a*) then notifies Core 0 (202*a*) when complete by enqueueing MCQ (206) with a response message with ID Msg0. Engine 0 (220*a*) also dequeues another message, eventually dequeueing Msg1 from the MSQ (216) and interpreting the message.
7. Engine 0 (220*a*) performs the message function invoked by Msg1 by configuring Memory Controller (226).
8. Memory Controller (226) is thus configured to take the contents at the offset specified in Msg1 from local buffer (224) and write it to the NVM address specified in Msg1.
9. Memory Controller (26) notifies Engine 0 (220*a*) when complete.
10. Engine 0 (220*a*) then notifies Core 0 (202*a*) when complete by enqueueing MCQ (206) with a response message with ID Msg1.

Figure 6:
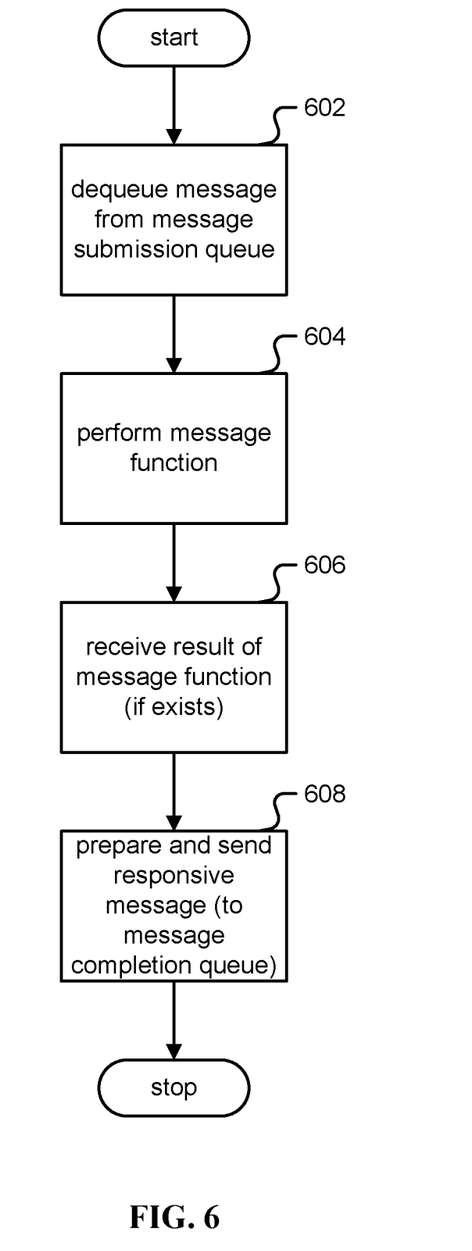
FIG. 6 is a flow chart illustrating an embodiment of a process for asynchronous communication between external processor and gate array device.

FIG. 6 is a flow chart illustrating an embodiment of a process for asynchronous communication between external processor and gate array device. In one embodiment, the process of FIG. 6 is carried out by an engine, for example Engine 0 (220*a*) of FIG. 2A.

In step 602, a memory access engine circuit (220) dequeues a next message from its corresponding message submission queue (216). In one embodiment, the message conforms to a queue-based message exchange protocol including an ID, opcode, and zero or more parameters and/or a configuration catalog. In one embodiment, the queue (216) is a ring buffer.

In step 604, the engine (220) performs a message function invoked by the message. In one embodiment, the message function is related to a memory access function including one or more of the following: read, write, and "push" read.

In step 606, the engine (220) receives a result of performing the message function. In step 608, the engine (220) prepares and sends to an external processing core (202) that sent the message a response message determined based at least in part on the result. In one embodiment, the response message is sent via a message completion queue (206).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A memory access device, comprising:
a communication interface to an external processor comprising one or more cores, wherein the communication interface is a PCIe bus and the external processor has a lower throughput PCIe root point;
a higher throughput non-volatile memory (NVM); and
a host interface module (HIM) coupled to the communication interface and the higher throughput NVM, wherein the HIM comprises:
   a lower throughput PCIe endpoint corresponding to the lower throughput PCIe root point of the external processor;
   a higher throughput PCIe endpoint corresponding to the higher throughput NVM; and
   a plurality of asynchronous memory access engine circuits, each configured to perform one or more memory access functions; and for each asynchronous memory access engine circuit, a corresponding message submission queue;
wherein:
   said one or more cores are configured to submit requests via said corresponding message submission queues; and
   each asynchronous memory access engine circuit is configured to:
      dequeue a next message from its corresponding message submission queue;
      perform a message function invoked by the message;
      receive a result of performing the message function; and
      prepare and send to an external processing core that sent the message a response message determined based at least in part on the result.

2. The memory access device recited in claim 1, wherein the memory access device is an FPGA.

3. The memory access device recited in claim 1, wherein the one or more memory access functions are associated with an associated set of one or more memory modules.

4. The memory access device recited in claim 3, wherein the message function is a memory access function including one or more of the following: read, write, and push read.

5. The memory access device recited in claim 1, wherein the message conforms to a queue-based message exchange protocol.

6. The memory access device recited in claim 5, wherein the queue-based message exchange protocol conforms to a configuration catalog.

7. The memory access device recited in claim 6, wherein the configuration catalog is associated with a plurality of PCI BARs (base address registers) associated with a PCI endpoint for the memory access device.

8. The memory access device recited in claim 7, wherein a plurality of PCI BARs are associated with a plurality of multiple sets of message queues.

9. The memory access device recited in claim 1, wherein the message includes a message identifier, an opcode, and zero or more parameters.

10. The memory access device recited in claim 9, wherein each response message comprises the message identifier.

11. The memory access device recited in claim 1, wherein each message submission queue is a ring buffer.

12. The memory access device recited in claim 1, wherein an external processor core is associated with a message completion queue.

13. The memory access device recited in claim 12, wherein each response message is sent via the message completion queue.

14. The memory access device recited in claim 13, wherein a given response message is permitted to be sent via the message completion queue in a different order than the message was received in the message submission queue.

15. The memory access device recited in claim 13, wherein the external processor core is associated with a return message submission queue and each asynchronous memory access engine circuit is associated with a corresponding return message completion queue.

16. The memory access device recited in claim 15, wherein the external processor core is configured to:
   dequeue a next return message from the return message submission queue;
   perform a core function invoked by the return message;
   receive a core result of performing the core function; and prepare and send to an associated asynchronous memory access engine circuit a return response message determined based at least in part on the core result via the corresponding return message completion queue.

17. The memory access device recited in claim 1, wherein each of the plurality of message submission queues differ by a priority ranking.

18. A method, comprising:
receiving a request via a message submission queue, wherein:
the request is sent from a core associated with an external processor coupled by a communication interface, wherein:
the communication interface is a PCIe bus and the external processor has a lower throughput PCIe root point;
the communication interface is coupled to a host interface module (HIM), wherein the HIM is coupled to a higher throughput non-volatile memory (NVM), and wherein the HIM comprises: a lower throughput PCIe endpoint corresponding to the lower throughput PCIe root point of the external processor; and a higher throughput PCIe endpoint corresponding to the higher throughput NVM;
and
the message submission queue is associated with an asynchronous memory access engine circuit configured to perform one or more memory access functions;
using the asynchronous memory access engine circuit to:
dequeue a next message from its corresponding message submission queue;
perform a message function invoked by the message;
receive a result of performing the message function; and
prepare and send to an external processing core that sent the message a response message determined based at least in part on the result.

19. A computer program product, the computer program product being embodied in a non-transitory computer readable storage medium and comprising computer instructions for:
receiving a request via a message submission queue, wherein:
the request is sent from a core associated with an external processor coupled by a communication interface, wherein:
the communication interface is a PCIe bus and the external processor has a lower throughput PCIe root point;
the communication interface is coupled to a host interface module (HIM), wherein the HIM is coupled to a higher throughput non-volatile memory (NVM), and wherein the HIM comprises: a lower throughput PCIe endpoint corresponding to the lower throughput PCIe root point of the external processor; and a higher throughput PCIe endpoint corresponding to the higher throughput NVM; and
the message submission queue is associated with an asynchronous memory access engine circuit configured to perform one or more memory access functions;
dequeueing a next message from its corresponding message submission queue;
performing a message function invoked by the message;
receiving a result of performing the message function; and
preparing and send to an external processing core that sent the message a response message determined based at least in part on the result.

* * * * *